March 22, 1966     S. H. A. SCHMAUS     3,241,719
DISPENSER HAVING SELECTIVELY REPEATING AND
PROPORTION VARYING MEANS Filed Nov. 1, 1963     3 Sheets-Sheet 1

INVENTOR.
SIEGFRIED H. A. SCHMAUS
BY
ATTORNEYS.

March 22, 1966

S. H. A. SCHMAUS 3,241,719

DISPENSER HAVING SELECTIVELY REPEATING AND
PROPORTION VARYING MEANS

Filed Nov. 1, 1963

INVENTOR.
SIEGFRIED H. A. SCHMAUS

BY *Robertson & Smythe*

ATTORNEYS.

March 22, 1966  S. H. A. SCHMAUS  3,241,719
DISPENSER HAVING SELECTIVELY REPEATING AND
PROPORTION VARYING MEANS
Filed Nov. 1, 1963  3 Sheets-Sheet 3

INVENTOR.
SIEGFRIED H. A. SCHMAUS
ATTORNEYS.

United States Patent Office 3,241,719
Patented Mar. 22, 1966

3,241,719
DISPENSER HAVING SELECTIVELY REPEATING AND PROPORTION VARYING MEANS
Siegfried H. A. Schmaus, Philadelphia, Pa., assignor to Ametek, Inc., New York, N.Y., a corporation of Delaware
Filed Nov. 1, 1963, Ser. No. 320,703
11 Claims. (Cl. 222—70)

This invention relates to dispensers and particularly to an improved dispenser for automatically dispensing one or more mixed drinks in succession.

The principal object of the invention is to provide a dispensing apparatus in which the dispensing of a plurality of liquids is controlled by a timing device.

Another object of the invention is to provide such a dispenser in which the ratio of one liquid to another can be varied.

Still another object of the invention is to provide such a dispenser in which one or a plurality of mixed drinks having the same ratio of liquids can be dispensed by pushing a single pushbutton.

Still another object of the invention is to provide such a dispensing apparatus in which different interchangeable means are provided to accommodate different quantities of liquid for different types of drinks.

Another object of the invention is to provide such a dispenser in which different orifice means may be provided for maintaining an optimum ratio between liquids to be mixed to form the drink.

In one aspect of the invention, a base having a standard thereon may support a plurality of bottles of liquid to be dispensed as a mixture. The bottles may be supported in inverted position at the top of the standard and may be in communication with separate cups. The cups may be readily changed so that different measured quantities may be employed in the mixed drink. There may be a reciprocable plunger within each measuring cup having a closure member at each end thereof and arranged such that in the lower position of the plunger, the measuring cup is open to the interior of the inverted bottle with the cup outlet closed; and in the upper position of the plunger, the interior of the bottle is closed to the cup while the outlet from the cup is opened.

In another aspect of the invention, the outlets from the measuring cups may be connected to a common dispensing spout beneath which the glass to receive the drink may be placed.

In still another aspect of the invention, a timing motor may be provided that rotates a cam shaft containing a plurality of cams thereon, arranged to provide time to dispense one or more mixed drinks in succession.

In a still further aspect of the invention, another cam and timing motor may be provided that controls the operation of one of the liquids being dispensed so as to vary the ratio of one liquid to the other within the mixed drink.

In still another aspect of the invention, adjustable means may be provided on the ratio cam, and different sized orifices may be provided for the outlet through which the liquid passes, the quantity of which is to be varied so as to change the ratio of the liquids in the mixed drink.

The above, other objects and novel features of the invention will become apparent from the following specification and accompanying drawings which are merely exemplary.

Figure 1:
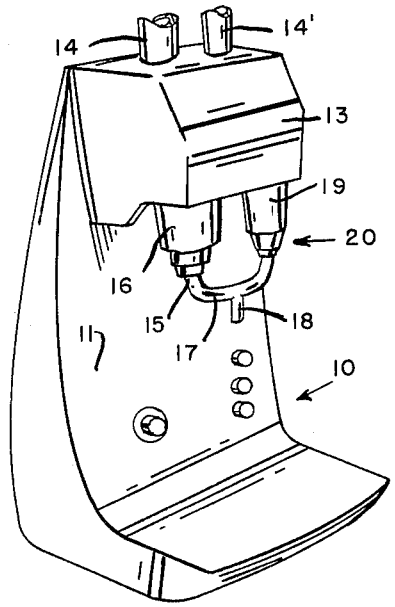
FIG. 1 is a perspective view of a dispenser to which the principles of the invention have been applied.
Figure 2:
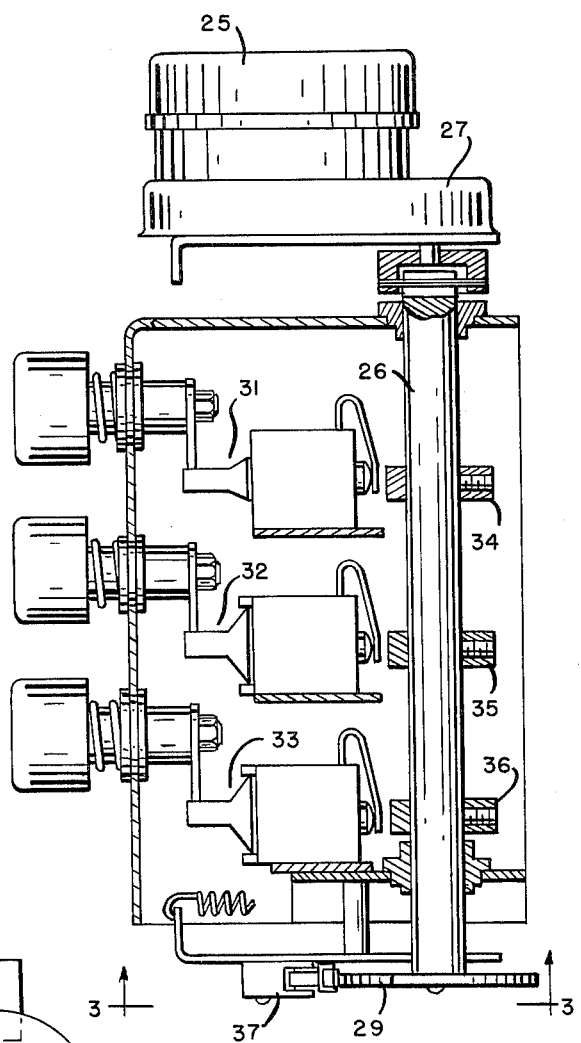
FIG. 2 is an elevational view of certain of the timing apparatus of the invention.
Figure 3:
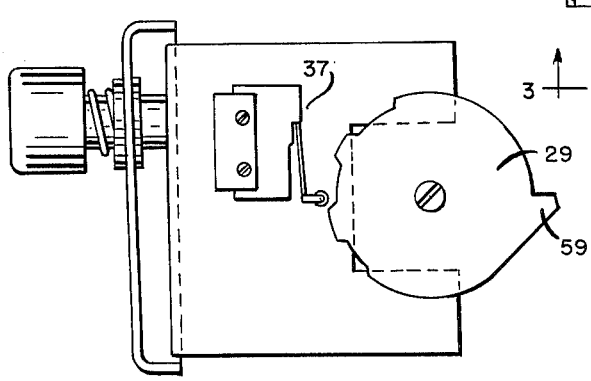
FIG. 3 is a view looking in the direction of the arrows, along line 3—3 of FIG. 2.
Figure 4:
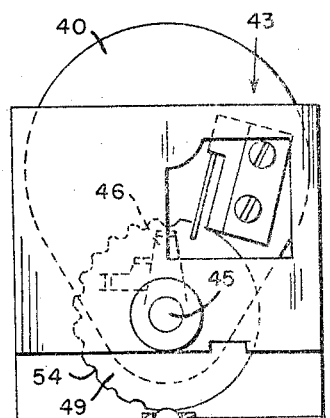
FIG. 4 is an end view of a timing device forming part of the ratio control mechanism of the invention.
Figure 5:
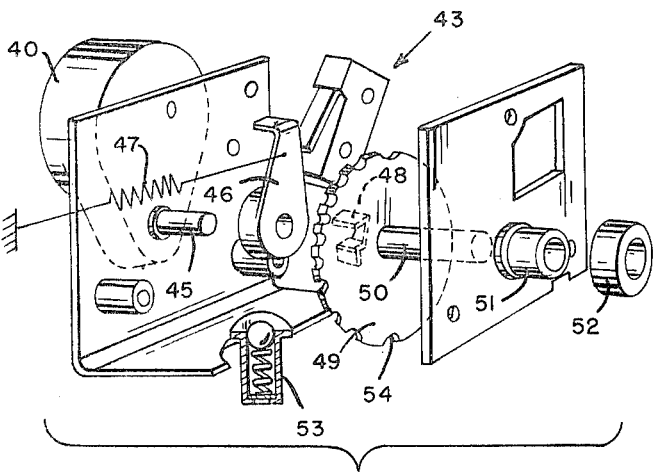
FIG. 5 is an exploded view of the device shown in FIG. 4.
Figure 6:
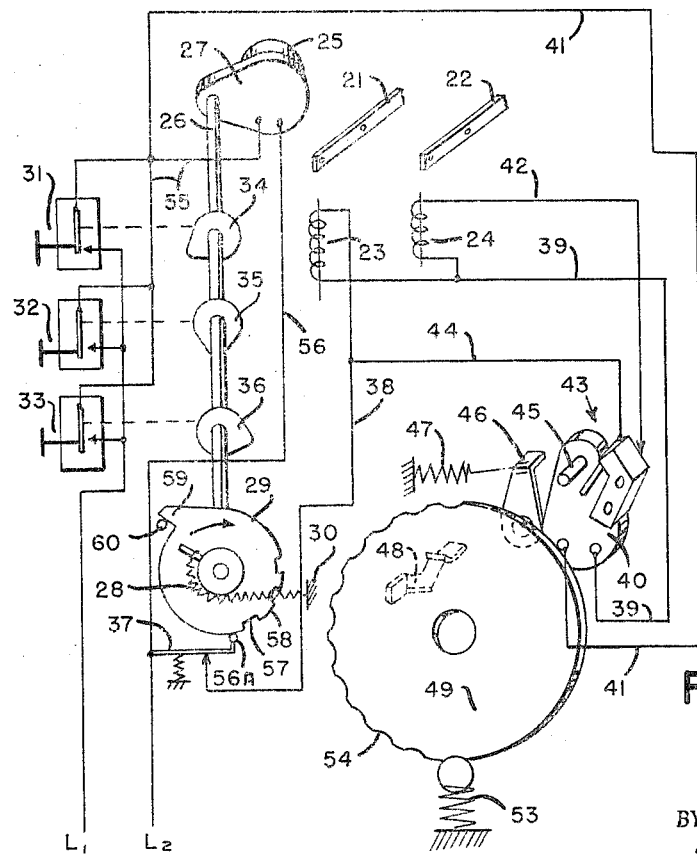
FIG. 6 is a wiring diagram for the dispenser.

Referring to the drawings, and particularly to FIG. 1, the principles of the invention are shown as applied to a cocktail dispenser including a base 10 having a standard 11 extending upwardly therefrom. The standard 11 may include near its upper end a separate housing 13 enclosing mechanism for dispensing liquids from inverted bottles 14, 14'. The mechanism within the housing 13 may include vertically reciprocable plunger means having a valve seat at each end and arranged so that in the lower position of the plunger means, the outlet 15 from a dispensing cup 16 is closed and the cup 16 is open to the interior of its corresponding bottle 14; and when the plunger is in its upper position, the interior of the bottle 14 is closed to cup 16, while the outlet 15 of cup 16 is open to a conduit 17 leading to a dispensing nozzle 18. There may be an identical cup 19 of the same or different size as cup 16, and cup 19 may be in communication with a bottle 14' of different liquid from that in bottle 14. Cup 16 may have an outlet 20 leading to nozzle 18. The operation of the plunger means for cups 16 and 19 may be effected by the operation of levers 21 and 22 (FIG. 6). The specific details of the above described mechanism form no part per se of the present invention. They may be similar to the dispensing mechanism shown, described and claimed in U.S. Patent No. 3,080,097 in the name of Siegfried H. A. Schmaus.

Referring to FIG. 6, the lever 21 for cup 16 may be connected to the armature of a solenoid 23, while arm 22 may be connected to the armature of a solenoid 24. Accordingly, selectively energizing solenoids 23 and 24 will affect the dispensing of a mixture of the contents of the bottles 14 and 14'.

The present invention includes the provision of a control for solenoids 23 and 24 which will have the capability of dispensing one or a plurality of mixed drinks in succession. To this end (FIG. 6), a synchronous motor 25 may drive a cam shaft 26 through a gear reduction unit 27 in the direction of the arrow, and against the action of a spring 28 that has one end connected to a cam 29 fixed to shaft 26 and its other end anchored at 30.

An electrical circuit is provided for motor 25 and includes parallel arranged pushbutton switches 31, 32 and 33. The switches 31, 32 and 33 are of the reset type; that is, when one of the switches is pushed, it will remain closed until some external force opens it. Accordingly, cams 34, 35 and 36 are mounted on shaft 26 and so arranged that switches 31, 32 and 33 successively will be opened (if closed) as the cam shaft 26 is rotated in the direction of the arrow. Furthermore, motor 25 rotates the shaft 26 through the speed reduction 27 at a slow rate of speed so that by the time cam 34 opens switch 31, if closed, there will be time for the cups 16 and 19 to be emptied of their contents. If switch 32 is closed, its opening by cam 35 will provide sufficient time for two complete filling and emptying cycles of cups 16 and 19; and if switch 33 is pushed, its opening by cam 36 will provide time for three complete cycles.

In order to energize solenoid 23, current flows from $L_2$ through contacts 37, line 38, solenoid 23, line 39, another synchronous motor 40, line 41, any of the switches 31, 32 and 33 to $L_1$. Energizing solenoid 23, of course, empties the cup 16. Current also flows from line $L_2$, contacts 37, line 38, line 44, switch 43, line 42, solenoid 24, line 39, motor 40, line 41, any of switches 31, 32 and 33 to $L_1$. Energizing solenoid 24 opens the valve on the plunger means of cup 19 to introduce the liquid from bottle 14' into the drink being mixed.

In order to vary the ratio of liquid from bottles 14 and 14', means is provided for limiting the amount of liquid from cup 19 while the entire contents of cup 16 is employed. To accomplish this, the motor 40 drives a shaft 45 to which a lever 46 is fixed. A spring 47 normally urges the lever 46 counterclockwise (FIG. 6) into engagement with a stop 48 on a disk 49 fixed to a shaft 50 that is journaled in a bearing 51 and has a knob 52 attached thereto. The disk 49 is adapted to be held in adjusted rotary position by a spring pressed detent 53 that cooperates with indentations 54 on the periphery of disk 49.

From the foregoing it is evident that when motor 40 is de-energized, spring 47 returns arm 46 to its position abutting stop 48; and when motor 40 is energized, it drives lever 46 into position to open normally closed switch 43. By turning knob 52, the rotary position of abutment 48 can be changed so that the distance, and hence the time, of travel of the arm 46 before opening switch 43 can be varied.

For example, pushing switch 32 causes current to flow from $L_1$, through switch 32, a line 55, motor 25, line 56 to $L_2$. Current also flows from line 55, through line 41, motor 40, line 39, solenoid 23, line 38, switch 37 to $L_2$; and through solenoid 24, line 42, normally closed switch 43, line 44, line 38, switch 37 to $L_2$. Accordingly, motors 25 and 40 are energized, as are solenoids 23 and 24. Solenoid 23 empties the contents of cup 16, while motor 40 drives arm 46 into position to open switch 43, thus de-energizing solenoid 24 to permit only a predetermined amount of the liquid in cup 19 to be used. When switch 43 is opened, the plunger means in cup 19 closes its outlet and opens its inlet for refilling of cup 19. As motor 25 continues to rotate shaft 26, cam 34 attempts to open switch 31 but it is already open since switch 32 was the one that was closed. Thus, motor 25 remains energized and when the roll 56A of switch 37 falls into a depression 57 on cam 29, switch 37 opens, de-energizing solenoid 23, closing the outlet of cup 16 and opening its inlet to effect refilling of the cup. When switch 37 opens, motor 40 is de-energized, causing spring 47 to return lever 46 to its position against abutment 48. It is to be noted that switch 32 is still closed since cam 35 has not yet reached it. Continued energization of motor 25 moves roll 56 onto the next land 58 on cam 29, closing switch 37 and re-energizing motor 40 as well as solenoids 23 and 24 to cause the dispensing cycle to be repeated. At the end of this second cycle, cam 35 opens switch 32, de-energizing motor 25, whereupon spring 28 returns cam 29 to its starting position with a land 59 thereof in contact with stop 60.

In using the apparatus for mixing cocktails, the percentages of vermouth, for example, should remain the same for sets of cups 16, 19 of different volumes. Thus, for a regular martini, there should be three parts gin and one part vermouth. The maximum time for lever 46 to open switch 43 may be two seconds, and when disk 49 is adjusted for minimum time, it may be only 0.4 second. This may provide a 3:1 ratio of gin (two-ounce cup 16) to vermouth (cup 19) at the two seconds or maximum time that switch 43 is closed, and as great a ratio as 10:1 at the 0.4 second or minimum time during which switch 43 is open. However, the cups 16 may vary between 2 and 1¼ ounces and yet the ratio of 3:1 must be maintained for a regular martini.

Figure 7:
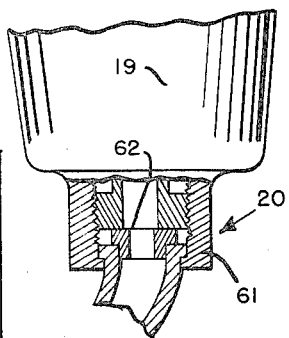
FIG. 7 is a detail showing the replaceable orifice in the outlet for the liquid, the quantity of which is to be varied to vary the ratio of the liquids in the mixed drink.

Referring to FIG. 7, cup 19 includes a spout 20 including a removable fitting 61 for holding an element 62 having an orifice of a predetermined size. There may be provided elements 62 having different sized orifices for different volume cups 19. The orifice diameter is based on liquid leaving the cup 19 by gravity flow in two seconds.

If the height of the interior of the cup 19 is H centimeters, the quantity therein is Q in cubic centimeters, and the area of the orifice in square centimeters is $f$. Pour time of cup is based on:

$$t = \frac{Q}{\mu \cdot f \cdot W_m}$$

where:

$t$ = time in seconds
$\mu$ = orifice factor = .8 where length of orifice equals one diameter $$W_m = \frac{\sqrt{2g \cdot H}}{2}$$

$g$ = 981 cm./sec.

Figure 8:
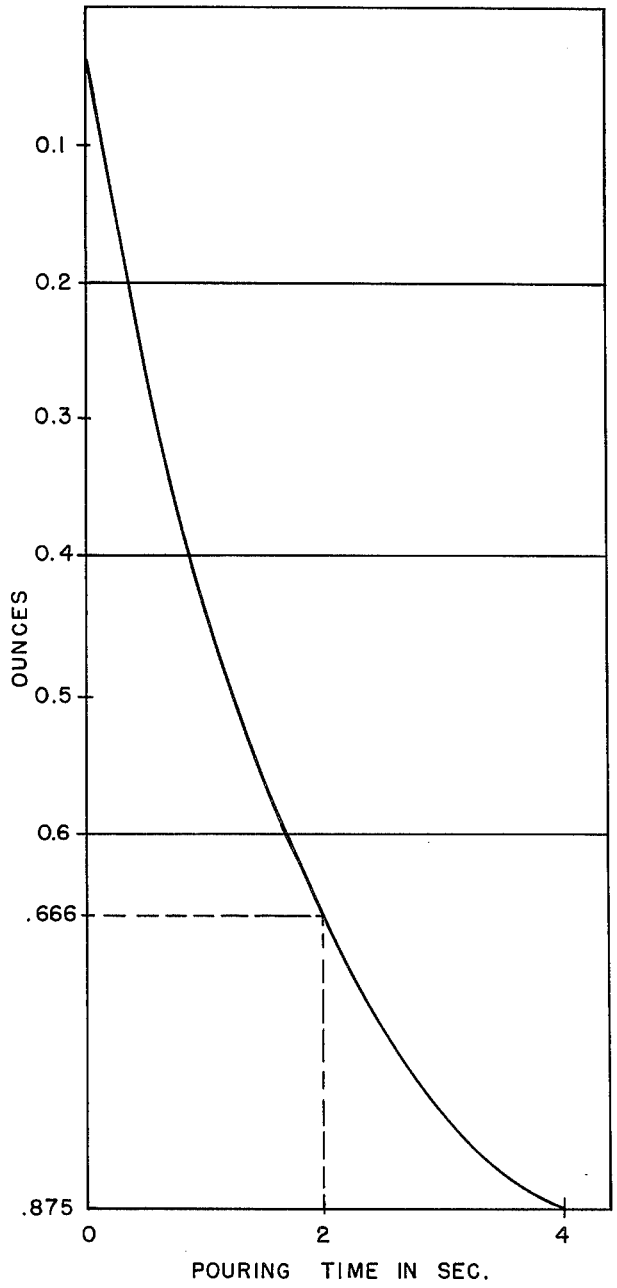
FIG. 8 is a curve showing the characteristics of the orifice in the outlet of one of the dispenser cups.

From the above equation, data was prepared and converted to inches and ounces, giving the curve shown in FIG. 8. The different ratio points on the curve have been calculated first and confirmed under actual test conditions using a ⅞ ounce cup 19. Since the largest gin cup 16 is 2 ounces, the largest volume on the vermouth side should be .666 ounce, based on a 3:1 ratio.

Due to the large cup 16 varying from 2 to 1¼ ounces, in ⅛ ounce steps, displacement inserts 62 were required in the small cup 19 to establish a 3:1 maximum ratio.

An analysis of the flow curve ounces versus pour time reveals that the close to straight portion of the parabolic curve has been used, such permitting a more predictable flow pattern when changing to a different orifice element 62. The orifice elements 62 having different hole sizes may be identifiable by color. When selecting the gin cup 16, the orifice element 62 in cup 19 must be selected to give a 3:1 ratio when the ratio selector is set at 2 seconds. For example, the 2-ounce gin cup requires an element 62 having a .144″ diameter orifice, and a 1¼ and 1⅝ ounce gin cup will need an element 62 having a .110″ diameter orifice. In actual tests, the total volume has been found to be within 1% accuracy.

Although the various features of the improved dispenser have been shown and described in detail to fully disclose one embodiment of the invention, it will be evident that changes may be made in such details and certain features may be used without others without departing from the principles of the invention.

What is claimed is:

1. In a dispenser for mixing drinks containing different percentages of different liquids, the combination comprising separate cup means for supplying separate liquids; conduit means having a single dispensing nozzle extending between said separate cup means; solenoid operated valve means for simultaneously opening an outlet in each of said cup means; timing means; circuit means connected to said timing means and said solenoid operated valve means for closing the outlet of one of said cup means independently of the closing of the outlet of said other cup means; and manually adjustable means connected to said timing means for varying the time of closing the outlet of said one of said cup means.

2. In a dispenser for dispensing one or more drinks, the combination comprising cup means for supplying liquid; solenoid operated valve means for opening and closing an outlet in said cup means; a timing motor; a cam shaft having a plurality of cams thereon driven by said timing motor; a plurality of separate locking switch means, each adapted to be unlocked by a cam on said cam shaft; circuit means connected to said timing motor and said solenoid operated valve means for energizing said timing motor and said solenoid operated valve means upon the closing of a selected of said locking switch means; other switch means in the circuit of said solenoid valve means; and other motor driven cam means for opening said other switch means to de-energize said solenoid valve means while said timing motor remains energized until the cam corresponding to the selected switch unlocks said switch.

3. In a dispenser for dispensing one or more drinks, the combination comprising cup means for supplying liquid; solenoid operated valve means for opening and closing an outlet in said cup means; a timing motor; a cam shaft having a plurality of cams thereon driven by said timing motor; a plurality of separate locking switch means, each adapted to be unlocked by a cam on said cam shaft; circuit means connected to said timing motor and said solenoid operated valve means for energizing said timing motor and said solenoid operated valve means upon the closing of a selected of said locking switch means; other switch means in the circuit of said solenoid valve means; and other motor driven cam means for opening said other switch means to de-energize said solenoid valve means while said timing motor remains energized until the cam corresponding to the selected switch unlocks said switch, said other cam means including means for reclosing said other switch means if more than one drink is to be dispensed.

4. In a dispenser for dispensing one or more drinks, the combination comprising cup means for supplying liquid; solenoid operated valve means for opening and closing an outlet in said cup means; a timing motor; a cam shaft having a plurality of cams thereon driven by said timing motor; a plurality of separate locking switch means, each adapted to be unlocked by a cam on said cam shaft; circuit means connected to said timing motor and said solenoid operated valve means for energizing said timing motor and said solenoid operated valve means upon the closing of a selected of said locking switch means; other switch means in the circuit of said solenoid valve means; other motor driven cam means for open-means; other switch means in the circuit of said solenoid valve means while said timing motor remains energized until the cam corresponding to the selected switch unlocks said switch; and means for returning said cam shaft to an initial position upon de-energizing of said timing motor.

5. In a dispenser for dispensing one or more drinks, the combination comprising cup means for supplying liquid; solenoid operated valve means for opening and closing an outlet in said cup means; a timing motor; a cam shaft having a plurality of cams thereon driven by said timing motor; a plurality of separate locking switch means, each adapted to be unlocked by a cam on said cam shaft; circuit means connected to said timing motor and said solenoid operated valve means for energizing said timing motor and said solenoid operated valve means upon the closing of a selected of said locking switch means; other switch means in the circuit of said solenoid valve means; other motor driven cam means for opening said other switch means to de-energize said solenoid valve means while said timing motor remains energized until the cam corresponding to the selected switch unlocks said switch, said other cam means including means for reclosing said other switch means if more than one drink is to be dispensed; and means for returning said cam shaft to an initial position upon de-energizing of said timing motor.

6. In a dispenser for dispensing one or more mixed drinks containing different percentages of different liquids, the combination comprising separate cup means for supplying separate liquids; separate solenoid operated valve means for opening and closing an outlet in each of said cup means; a timing motor; a cam shaft having a plurality of cams thereon driven by said timing motor; a plurality of separate locking swtich means, each adapted to be unlocked by a cam on said cam shaft; another timing motor; circuit means connected to said timing motors and said separate solenoid operated valve means for energizing both said timing motors and said separate solenoid operated valve means upon the closing of a selected of said locking switch means; and means responsive to said other timing motor for de-energizing one of said solenoid operated valve means while said other remains energized.

7. In a dispenser for dispensing one or more mixed drinks containing different percentages of different liquids, the combination comprising separate cup means for supplying separate liquids; separate solenoid operated valve means for opening and closing an outlet in each of said cup means; a timing motor; a cam shaft having a plurality of cams thereon driven by said timing motor; a plurality of separate locking switch means, each adapted to be unlocked by a cam on said cam shaft; another timing motor; circuit means connected to said timing motors and said separate solenoid operated valve means for energizing both said timing motors and said separate solenoid operated valve means upon the closing of a selected of said locking switch means; means responsive to said other timing motor for de-energizing one of said solenoid operated valve means while said other remains energized; other switch means in the circuit of said solenoid valve means; and other motor driven cam means for opening said other switch means to de-energize said solenoid valve means while the timing motor connected to the cam shaft remains energized until the cam corresponding to the selected switch unlocks said switch.

8. In a dispenser for dispensing one or more mixed drinks containing different percentages of different liquids, the combination comprising separate cup means for supplying separate liquids; separate solenoid operated valve means for opening and closing an outlet in each of said cup means; a timing motor; a cam shaft having a plurality of cams thereon driven by said timing motor; a plurality of separate locking switch means, each adapted to be unlocked by a cam on said cam shaft; another timing motor; circuit means connected to said timing motors and said separate solenoid operated valve means for energizing both said timing motors and said separate solenoid operated valve means upon the closing of a selected of said locking switch means; means responsive to said other timing motor for de-energizing one of said solenoid operated valve means while said other remains energized; and means for returning said timing motors to an initial position upon their de-energization.

9. In a dispenser for dispensing one or more mixed drinks containing different percentages of different liquids, the combination comprising separate cup means for supplying separate liquids; separate solenoid operated valve means for opening and closing an outlet in each of said cup means; a timing motor; a cam shaft having a plurality of cams thereon driven by said timing motor; a plurality of separate locking switch means, each adapted to be unlocked by a cam on said cam shaft; another timing motor; circuit means connected to said timing motors and said separate solenoid operated valve means for energizing both said timing motors and said separate solenoid operated valve means upon the closing of a selected of said locking switch means; means responsive to said other timing motor for de-energizing one of said solenoid operated valve means while said other remains energized; other switch means in the circuit of said solenoid valve means; other motor driven cam means for opening said other switch means to de-energize said solenoid valve means while the timing motor connected to the cam shaft remains energized until the cam corresponding to the selected switch unlocks said switch; and means for returning said timing motors to an initial position upon their de-energization.

10. In a dispenser for mixing drinks containing different percentages of different liquids, the combination comprising separate cup means for supplying separate liquids; conduit means having a single dispensing nozzle extending between said separate cup means; solenoid operated valve means for simultaneously opening an outlet in each of said cup means; timing means; circuit means connected to said timing means and said solenoid operated valve means for closing the outlet of one of said cup means independently of the closing of the outlet of said other cup means; replaceable orifice means within the outlet of the cup means that is controlled by the solenoid operated valve means that is de-energized by said timing means; and manually adjustable means connected to said timing means for varying the time of closing the outlet of said one of said cup means.

11. In a dispenser for dispensing one or more mixed drinks containing different percentages of different liquids, the combination comprising separate cup means for supplying separate liquids; separate solenoid operated valve means for opening and closing an outlet in each of said cup means; a timing motor; a cam shaft having a plurality of cams thereon driven by said timing motor; a plurality of separate locking switch means, each adapted to be unlocked by a cam on said cam shaft; another timing motor; circuit means connected to said timing motors and said separate solenoid operated valve means for energizing both said timing motors and said separate solenoid operated valve means upon the closing of a selected of said locking switch means; means responsive to said other timing motor for de-energizing one of said solenoid operated valve means while said other remains energized; and replaceable orifice means within the outlet of the cup means that is controlled by the solenoid operated valve means that is de-energized by said other timing motor.

References Cited by the Examiner

UNITED STATES PATENTS

| | | | |
|---|---|---|---|
| 2,919,053 | 12/1959 | Briggs | 222—76 |
| 3,031,102 | 4/1962 | Storms | 222—70 X |
| 3,034,685 | 5/1962 | Breitenstein | 222—144.5 X |
| 3,054,533 | 9/1962 | Kurek | 222—70 |
| 3,080,097 | 3/1963 | Schmaus | 222—189 |
| 3,112,844 | 12/1963 | Keller et al. | 222—76 X |
| 3,133,674 | 5/1964 | Schmaus | 222—70 |
| 3,145,741 | 8/1964 | Smith | 222—70 X |

M. HENSON WOOD, JR., *Primary Examiner.*

LOUIS J. DEMBO, *Examiner.*